United States Patent [19]

Kawase et al.

[11] Patent Number: 5,745,667
[45] Date of Patent: Apr. 28, 1998

[54] 3D GRAPHICS APPARATUS USING TEXTURE IMAGES WITH DISPLACEMENT INFORMATION

[75] Inventors: Kei Kawase, Sagamihara; Fusashi Nakamura, Tokyo-to; Yoshihisa Takatsu, Yamato, all of Japan

[73] Assignee: International Business Machines Corporation, Armonk, N.Y.

[21] Appl. No.: 600,440

[22] Filed: Feb. 13, 1996

[30] Foreign Application Priority Data

Feb. 14, 1995 [JP] Japan ................................ 7-025023

[51] Int. Cl.$^6$ ................................ G06F 15/00
[52] U.S. Cl. ................................ 395/130
[58] Field of Search ................................ 395/130, 131, 395/127, 114, 115, 116, 129

[56] References Cited

U.S. PATENT DOCUMENTS 5,586,234  12/1996  Sakuraba et al. .................. 395/130
5,630,038   5/1997  Itoh et al. ........................ 395/131

FOREIGN PATENT DOCUMENTS 2228850  9/1990  United Kingdom .

OTHER PUBLICATIONS

"Atoms with Transparency and Shadows", Nelson L. Max, 2435 Computer Vision, Graphics and Image Processing 27 (1984), Jul., No. 1, New York, pp. 46–63.
Visualization of Molecular Structures Under the Graphics API V2 Environment at IBM 6090 and RISC System/6000 Workstations, IBM Technical Disclosure Bulletin, vol. 33, No. 10A, Mar. 1991, pp. 92–93.

Primary Examiner—Phu K. Nguyen
Attorney, Agent, or Firm—Jay P. Sbrollini

[57] ABSTRACT

A texture memory for storing color information of a surface of an object and displacement information of the object, wherein the information is prepared in advance; reading means for reading out the color information of the surface of the object and the displacement information of the object necessary for drawing the object from the texture memory in response to receiving a command instructing to draw the object stored in the texture memory according to a size and a position, if necessary, color information and displacement information specified by the command; size modifying means for expanding or reducing and/or modifying the read color information of the surface of the object and the read displacement information of the object by using the color information and the displacement information, and if specified, using the specified displacement information if specified so as to correspond to the size and the displacement specified in the command; color modifying means for modifying the color information processed by the size modifying means based on the specified color information if specified; and hidden surface processing means for performing a hidden surface removal for the drawing surface of the object by using the color information of the surface of the object and the displacement information of the object from the size modifying means or the color modifying means and by the position specified in the command. This enables a rapid measure to be taken against the case of drawing a great number of spheres, pipes or the like.

10 Claims, 5 Drawing Sheets

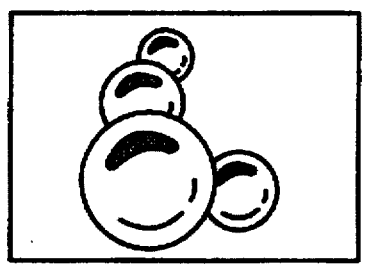
Fig. 4
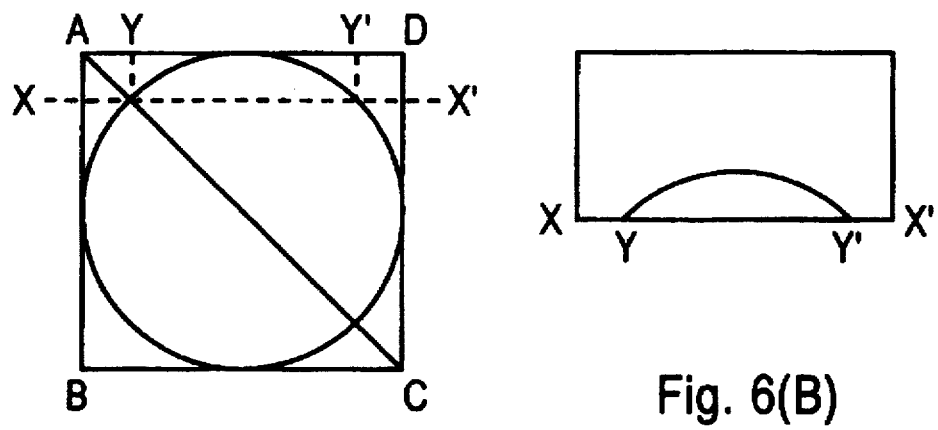
Fig. 6(A)
Fig. 6(B)
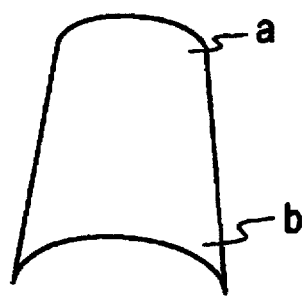
Fig. 7

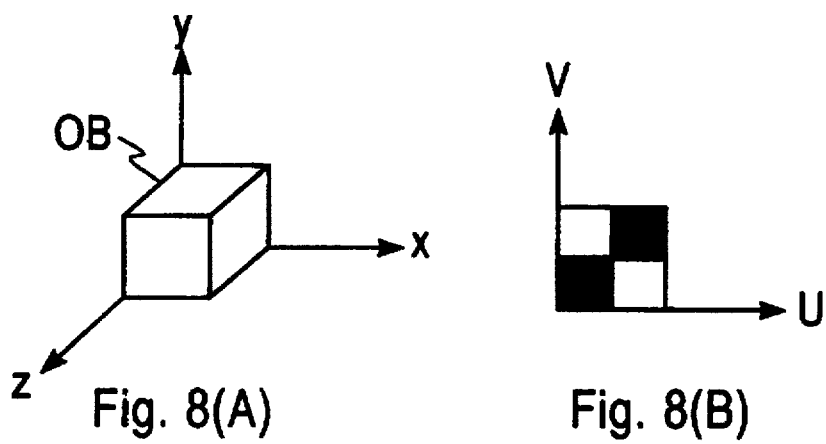
Fig. 8(A)
Fig. 8(B)
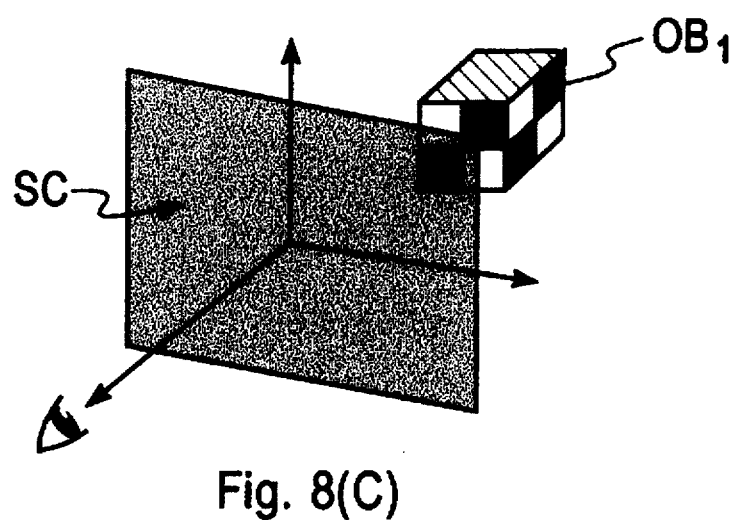
Fig. 8(C)
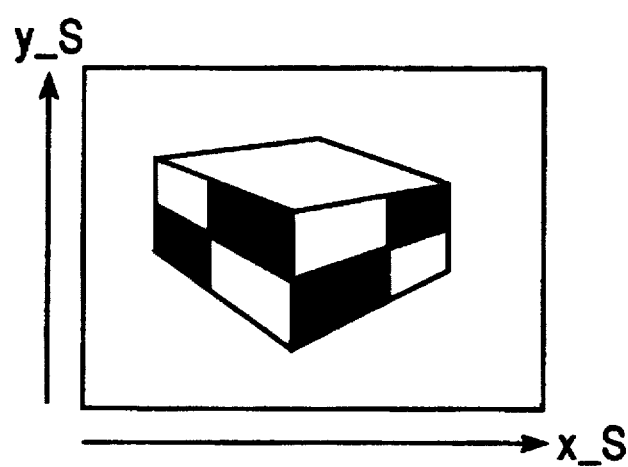
Fig. 8(D)

3D GRAPHICS APPARATUS USING TEXTURE IMAGES WITH DISPLACEMENT INFORMATION

DETAILED DESCRIPTION OF THE INVENTION

1. Field of the Invention

The present invention is related to 3D graphics systems, more specifically, to an apparatus for the texture mapping of a 3D object by using a texture images with displacement information.

2. Background Art

In computer graphics, there are cases where an image is formed by texture mapping wherein various patterns (or textures), for example, 2-dimensional images such as wood grain or striped pattern, are mapped onto a surface, for example, a watermelon. In this way, texture mapping typically involves the mapping of a 2-dimensional image.

However, if an image with displacement information can be mapped, it will be serviceable in some cases, for example, the case of drawing numerous spheres. Typically, the following steps are required to draw a sphere:

1. Dividing the sphere into numerous fine triangles till approximated by a sufficiently smooth group of surfaces;
2. Determining the colors of vertices of each triangle by a lighting calculation for the respective vertices; and
3. Drawing the points inside each triangle by using the calculated color of each vertex, interpolating the Z value (actual distance from the view point to the drawing point), and performing a depth test;

If a scene involves multiple spheres, the steps described above must be repeated for each of the spheres. Such steps are necessary even if the graphics API (e.g., graPHIGS) allows the application developer to specify the coordinates (x, y, z) of the center of the sphere and its radius (R).

The amount of calculations required for dividing the sphere into the numerous triangles in the above step 1, and the calculations related to deriving the colors of the vertices by lighting in the above step 2, are enormous even for a single sphere. Therefore, the calculation for numerous spheres requires a rather high speed geometry processor. When spheres are overlap, one sphere encroaches on another, and so on, the boundary between the spheres forms a complicated line and accordingly the boundary line is difficult to represent accurately utilizing the above mentioned method.

To draw numerous spheres utilizing the method described above places a considerable burden on a 3D computer graphics system. Under certain cases, however, it may be necessary to fulfill the aforesaid steps (what the step 3 concerns, calculating the Z value in each vertex by interpolation) about a single sphere when drawing multiple spheres. One example of such a case is molecular CAD wherein a group of atoms is represented by multiple spheres. In these cases, because the positional relationship between the individual spheres and a light source as well as the positional relationship between the individual spheres and a view point differs among numerous spheres, the aforesaid steps must be performed strictly for each individual sphere. However, for what is so small as to be actually invisible, such as an atom, the positional relationship between a light source and a view point can be regarded as an identical point for all the spheres. In this case, if no strict handling is required for the positional relation between a light source and a view point, executing the aforesaid steps for one sphere and diverting the calculated data to the other spheres enables a rapid rendering of the spheres.

That is, when drawing numerous spheres, if it is arranged to hold displacement information corresponding to precalculated color information about the surface of an object (e.g., sphere) and to map it to a specified location of texture map, only the texture mapping step is necessary for the other spheres after performing the calculation of polygon division, lighting, and the like only for the one sphere. In addition, the depth test can also be executed easily because the distance of each position on the surface of individual spheres from the screen can be calculated based on the displacement information and the coordinates of the center of a specified spheres. Thus, when one sphere encroaches upon another, the depth test may be used to accurately define the boundary line between the spheres.

As a conventional example of mapping data in the depth direction, there is a method called a bump mapping wherein a principal normal is mapped to the surface of an object. Bump mapping provides for more realistic rendering, but in many instances is not executable in a speed suitable for interactive applications.

Thus, there is a need for a graphics system that provides for efficient texture mapping of texture information onto objects that are represented by color information and displacement information (in the depth direction to the screen of a display). The objects may be spheres or pipes.

SUMMARY OF THE INVENTION

The present invention provides a 3D graphics apparatus using texture images with displacement information, comprising: a texture memory for storing color information of a surface of an object and displacement information of the object, wherein the information is prepared in advance; reading means for reading out the color information of a surface of an object and the displacement information of the object necessary for drawing the object from the texture memory in response to receiving a command instructing to draw the object stored in the texture memory according to a size and a position, if necessary, color information and displacement information specified by the command; size modifying means for expanding or reducing and/or modifying the read color information and the read displacement information by using the color information and the displacement information, and if specified, using the specified displacement information if specified so as to correspond to the size and the displacement specified in the command; color modifying means for modifying the color information of a surface of an object processed by the size modifying means based on the specified color information if specified; and hidden surface processing means for performing a hidden surface removal for the drawing surface of the object by using the color information and the displacement information from the size modifying means and/or the color modifying means. Using this apparatus enables one to rapidly cope with the case of drawing a great number of spheres, pipes or the like.

The reading means of the present invention preferably comprises: means for identifying the information necessary for drawing the object, and calculating the address in the texture memory in which the information is stored in response to the command; and means for reading the necessary information of an object from the texture memory using the address calculated.

The hidden surface processing means of the present invention preferably comprises: means for calculating the displacement position of a surface of the object from the displacement information of the object processed by the size modifying means and the displacement position in the depth direction to the screen on which the object is to be drawn among the positions specified in the command; and means for performing a hidden surface removal based on the calculated displacement position of a surface of the object and from the plane position in the parallel direction to the drawing screen of the object among the positions specified in the command.

An alternate embodiment of the present invention is a 3D graphics apparatus using texture images with displacement information comprising: a texture memory for storing color information of a surface of an object and displacement information of the object, wherein the information is prepared in advance; texture memory reading means for calculating the expanding/reducing ratio of the object to be drawn for the object stored in the texture memory and reading out the color information of a surface of the object and the displacement information of the object necessary for drawing the object from the texture memory in response to receiving a command instructing to draw the object stored in the texture memory according to a size and a position, if necessary, color information and displacement information specified by the command; scaling means for performing an expanding/reducing processing on the read color information of the surface of the object and the read displacement information of the object in accordance with the calculated expanding/reducing ratio and correcting the read displacement information in accordance with the specified displacement information if specified; means for correcting the color information subjected to the expanding/reducing processing for the surface of the object by using the specified color information if specified in the command; and hidden surface processing means for calculating the displacement position of the surface of the object to be drawn from the displacement information of the object processed by the scaling means and from the displacement position in the depth direction to the drawing screen of the object among the positions specified in the command. Thus, texture images with displacement information is utilized to enable drawing in high speed.

The texture memory read means of the alternate embodiment preferably comprises: means for identifying the information of the object necessary for drawing the object, for calculating the address in the texture memory in which the information is stored, and for calculating the expanding/reducing ratio in response to receiving the command.

BRIEF DESCRIPTION OF THE DRAWINGS

FIG. 4 illustrates the appearance of many spheres drawn on a screen;

FIGS. 6(A) and (B) illustrate the modeling of a sphere;

FIG. 7 illustrates the displacement information associated with the sphere of FIGS. 6(A) and (B);

FIGS. 8(A)–(C) illustrate the coordinate systems of the rendering process as performed by the graphics system of FIG. 5.

DESCRIPTION OF THE EMBODIMENTS OF THE PRESENT INVENTION

Figure 1:
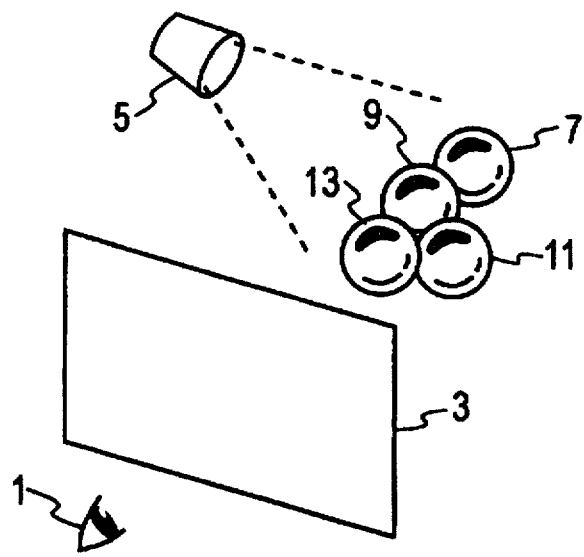
FIG. 1 illustrates the environment in the case of drawing numerous spheres.

According to the first embodiment of the present invention, a reading means (25, 29) detects the color information of a surface of an object and the displacement information of the object necessary for drawing the object specified by the command in response to the command from the previous stage (21, 23 in FIG. 5) instructing to draw the object stored in the texture memory according to a size and a position, if necessary, color information and displacement information specified by the command, calculates the address in the texture memory in which the information is stored and reads out the information stored at the address. Then, the size modifying means (29) expands or reduces and/or modifies the read color information and the read displacement information by using the color information and the displacement information, and if specified, using the specified displacement information if specified so as to correspond to the size and the displacement specified in the command. Furthermore, the color modifying means (31) modifies the color information processed by the size modifying means based on the specified color information if specified. And, the hidden surface processing means (33, 35) calculates the displacement position for the drawing surface of the object by using the displacement information from the size modifying means and the displacement position in the depth direction to the drawing screen of the object among the positions specified in the command (33), and performs a hidden surface removal by using the calculated displacement position for the surface of the object and the plane position in a parallel direction to the drawing screen of the object among the positions specified in the command (35). Thus, since the display data are generated in the frame buffer, the object according to the command is displayed on the screen of the display.

According to the second embodiment of the present invention, the texture memory reading means (25, 29) identifies the color information of a surface of an object and the displacement information of the object necessary for drawing the object, calculates the address in the texture memory in which the information is stored, and further calculates the expanding/reducing ratio for the object stored in the texture memory to be drawn in response to the command from the previous steps (21, 23 of FIG. 5) instructing to draw the object stored in the texture memory according to a size and a position, if necessary, color information and displacement information specified by the command. In response to this, the scaling means (29, 33) performs an expanding/reducing processing on the read information of the object in accordance with the calculated expanding/reducing ratio and corrects the read displacement information of the object in accordance with the specified displacement information if specified. And, the color information subjected to the expanding/reducing processing for a surface of the object is corrected by using the specified color information if specified in the command (31). Finally, the displacement position of a surface of the object to be drawn is calculated from the displacement information of the object processed by the scaling means and from the displacement position in the depth direction to the drawing screen of the object among the positions specified in the command to perform a hidden surface processing (33, 35). Thus, a high speed drawing system with an effective use made of the expanding/reducing ratio is obtained.

In order to explain in more detail the embodiments set forth above, background information related to texture mapping is now set forth. In the computer graphics, it is general to represent an object by using the following three types of coordinate systems.

The first is a model coordinate system. This model coordinate system is a coordinate system peculiar to each individual object, that is, a coordinate system to be appropriately selected for describing an object. FIG. 8(A) shows a cubic OB as an object in a rectangular coordinate system with the X-axis, Y-axis and Z-axis perpendicularly intersecting each other as one example.

The second is an eye coordinate system. This eye coordinate system is a coordinate system in which an object is agreed with the position of the eye situated when actually viewing the object, that is, a coordinate system in which the line of sight coincides with one coordinate axis as shown in FIG. 8(C).

The third is a screen coordinate system. As shown in FIG. 8(D), this screen coordinate system is a coordinate system in the 2-dimensional screen SC on which a 3-dimensional scene including an object is projected (cf. FIG. 8(C)). The screen coordinate system in FIG. 8(C) comprises the abscissa of X_S axis and the ordinate of Y_S axis perpendicularly intersecting.

Besides one of the above three types of coordinate systems, the texture mapping requires a coordinate system for describing the texture image data (hereinafter, referred to as texture coordinate system) as shown in FIG. 8(B). The texture coordinate system in FIG. 8(B) comprises the abscissa of U-axis and the ordinate of V-axis perpendicularly intersecting. The normalized coordinate system for the texture image data described with this set of (u, v) is represented by the S-axis and T-axis. An image described with the normalized coordinates (s, t) in an ordinary system is converted into one described with the coordinates (u, v) by multiplication of the size of the texture image data. The actual operation of a texture mapping is to draw the color of the texture image data specified with the texture coordinates at the point to draw the original color of an object at the screen coordinate system.

The above model coordinate system is a coordinate system for simply describing each basic object for convenience when handling a complex object comprising a combination of basic objects. Accordingly, to describe a complicated object with a screen coordinate system by the texture mapping, the complicated object assembled of these plural basic objects is converted in the representation of eye coordinate system. Here, the case of performing a shading on the top surface and a texture mapping on the side surface for a cubic OB will be described (cf. cubic OB1 of FIG. 8(C)). Thereafter, it is considered to project a plurality of basic objects described onto the screen SC. At this point, a complicated object (cubic OB1) is described in terms of a screen coordinate system. Incidentally, to simplify the following description, the object to be handled is assumed to has already been converted into the representation of screen coordinate system.

Figure 9A:
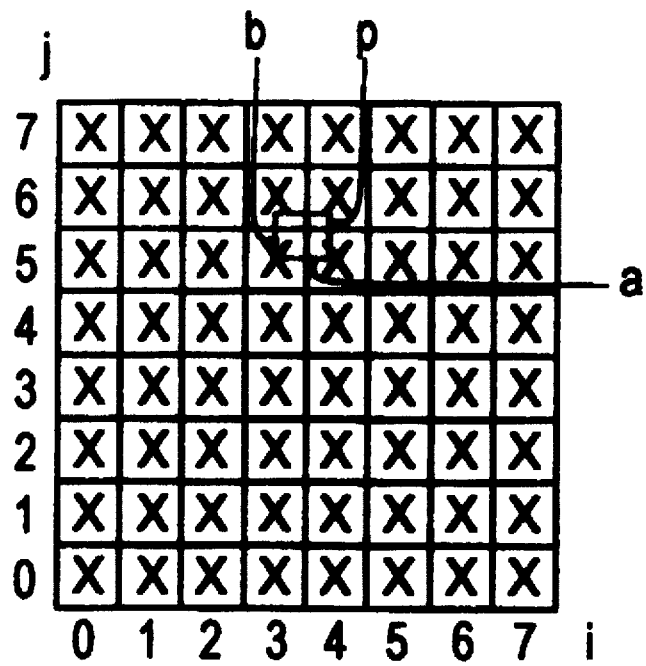
FIGS. 9(A) and (B) illustrate a mipmap.

As shown in FIG. 9(A), texture image data form a square of predetermined size (square region formed with 8×8 unit squares in FIG. 9(A)) with unit squares (squares having sides of unit length) disposed lengthwise and crosswise on a plane. At the center of each unit square, which is this lattice point, that is, the lattice point (mark "X" in the figure) corresponding to the i-th column (i:0≦i≦7) and the j-th row (j:0≦j≦7), the color information of the image to be mapped is stored.

Hereinafter, each unit square is called a texel, the center of a unit square called a texel center, the color information stored at the texel center called a texel value and the predetermined-sized square region placing a texel called a texture. The number of texels (8 in FIG. 9(A)) contained in one side of a texture is called the size of the texture. For simplification of the following description, a texel value for the texel (i, j) of the j-th row and the i-th column is abbreviated to T[i, j].

Next, when mapping a texture on a curved surface, an ordinary curved surface is divided into polygons. In the eye coordinate system, the texture mapping becomes a linear transformation between a polygon and a texture. By this transformation, each point on the polygon strictly one to one corresponds to the respective point in the texture and further this correspondence can be completely determined at a point of mapping the texture onto the polygon. Finally, the color of each pixel in the polygon projected onto the screen must be determined. Accordingly, the screen coordinate system must have each texel in the texture in correspondence with the respective pixel in the eye coordinate system, but the coordinates of a point P (u, v) in the texture corresponding to the pixel (x_s, y_s) are definite because the screen coordinate system is a projection of the eye coordinate system onto the screen SC. Using this correspondence, the color of a pixel (x_s, y_s) is determined. Algorithms generally used in determining the color are roughly divided into methods for using the original texture image data and processed data of the original data called mipmap, described later, and methods for using the original texture image data or the like without using a mipmap.

One texture mapping mechanism that does not use mipmaps assigns the texel value of a texel including the point P to the color of the pixel. That is, the texel value T[$i_o$, $j_o$] of a texel ($i_o$, $j_o$) in the most nearest texture to the point P is assigned to the color of the pixel. The augments $i_o$, $j_o$ can be determined as the integer parts of u+0.5, v+0.5 respectively. This is a method called texel nearest in the OpenGL (Mar Segal, Akeley, The OpenGL Graphics System: A Specification Version 1.0), one type of API (Application Program Interface), a 3-dimensional graphics interface.

However, when the polygon subjected to a texture mapping lies near and is largely expanded on the screen coordinate system, a single texel value corresponds to many pixels and accordingly a shape like a surface covered with tiles is obtained and a notched image is generated.

Another texture mapping method that does not use mipmaps is the second texel linear interpolated method (abbreviated to Texel Linear and hereinafter referred to as texel linear), an improvement of the above method. In this case, the linear interpolation is performed using four texel values surrounding the point P as shown in FIG. 9(A). That is, letting ($i_o$, $j_o$), ($i_o$+1, $j_o$), ($i_o$, $j_o$+1) and ($i_o$+1, $j_o$+1) be the centers (x marks in FIG. 9(A)) of four texels surrounding the point P (u, v) and setting a=the minority part of u and b=the minority part of v, a value obtained with the following equation is assigned to the color of the pixel:

$$(1-a)\times(1-b)\times T[i_o, j_o]+(1-a)\times b\times T[i_o, j_o+1]+a\times(1-b)\times T[i_o+1, j_o]+a\times b\times T[i_o+1, j_o+1]$$

The augments $i_o$, $j_o$ can be determined as the integer part of u, v. Other evaluation methods are equivalent to continuously executing two linear interpolations as understood from the above equation and accordingly this second method is also called bilinear.

Next, the mipmap texture mapping method will be described. A more detailed description of the mipmap method may be found J. Neider et al., "OpenGL Programming Guide: The Official Guide to Learning OpenGL, Release 1", pg. 266–274, Addison-Wesley Pub. Co., 1993, herein incorporated by reference in its entirety. According to the mipmap method, since the expanding/reducing ratio of a texel at each point on the projected polygon largely varies in accordance with the position of the pixel, disadvantages appear when a polygon spanning a large angle to the screen is projected. That is, for a texel to be extremely reduced on the screen, the weighted mean of four texels as mentioned above is not enough and more texels are required. These required texels can be evaluated from the inter-pixel-texel expanding/reducing ratio $\rho$ (computable from the correspondence relation of a pixel to a texel and generated when performing a linear interpolation calculation). A method for varying the averaging for each pixel like this (method called convolution) is effective but not efficient and is difficult in packaging. Consequently, a mipmap described later is alternatively used in general.

Figure 9B:
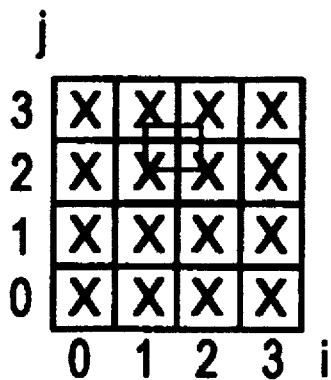

The first step of a mipmap method is to divide original texels in the texture into a block comprising two texels for each of lengthwise and crosswise directions, enclosed with a thick line in FIG. 9(A). Then, the texel value of the block is evaluated by averaging the texel values of four texels included in the block. Then, as shown in FIG. 9(B), by generating a new texel for making it correspond to the evaluated value, and arranging them in accordance with the original order, a new texture is generated. To distinguish a new texture generated by collecting texels into blocks from the original texture before generation, the original texture (FIG. 9(A)) is called a mipmap of level 0 and a new texture (FIG. 9(B)), whose size becomes half in this case, is called a mipmap of level 1. Then, a mipmap of level 2 is generated through similar processing of the mipmap of level 1. By repeating a processing similar to the processing leading to the generation of a mipmap of level 1, a mipmap of a higher level is generated. incidentally, it is a matter of course that a texel value depends here on the level of a mipmap. To represent this dependence, a texel value of the texel $(i, j)$ in a mipmap of level $k$ is designated with $T[i, j:k]$ by extending the above notation.

Prior to performing a texture mapping by using this mipmap, the level of a mipmap to be used has to be determined from the above $\rho$. Though detailed rules are laid down in the OpenGL, description will here be simplified only to the necessary part. Like the above texel nearest and texel linear, there are the concept of mipmap nearest and mipmap linear and consequently four types of texel mipmap methods in total. Incidentally, since the coordinates $P(u, v)$ of the point corresponding to a pixel in a mipmap of each level turn to coordinates $P(u_k, v_k)$ dependent on the level $k$, attention must be paid.

Then, each of the four texel mipmap methods will be described.

1. Nearest-Mipmap-Nearest

Setting k=(integer part of $\rho$+0.5), evaluate the point $P_k$ (u, v) corresponding to a pixel in a mipmap of level k and assign the texel value $T[i_o, j_o:k]$ including the point $P_k$ to the color of the pixel.

2. Linear-Mipmap-Nearest

Setting k=(integer part of $\rho$+0.5), evaluate the point $P_k$ ($U_k$, $V_k$) corresponding to a pixel in a mipmap of level k and linearly interpolate the texel values of four texels surrounding the point $P_k$. This is similar to the texel linear described above except for "level k".

3. Nearest-Mipmap-Linear

Setting k=(integer part of $\rho$), linearly interpolate the texel values of the respective texels including the points: $P_k$, $P_{k+1}$ corresponding to a pixel in individual mipmaps of level k and level k+1 by using d=(minority part of $\rho$) as the ratio of interior division.

4. Linear-Mipmap-Linear

Setting k=(integer part of $\rho$), linearly interpolate the linearly interpolated result of the texel values of four texels including the point $P_k$ corresponding to a pixel in a mipmap of level k (texel linear) and the linearly interpolated result of the texel values of four texels including the point $P_{k+1}$ corresponding to a pixel in a mipmap of level k+1 (texel linear) by using d=(minority part of $\rho$) as the ratio of interior division (mipmap linear).

In addition, in order to explain in more detail the embodiments set forth above, background information related to rendering a scene that includes numerous spheres is presented below. As shown in FIG. 1, consider a scene in which the spheres 7, 9, 11 and 13 receive a ray of light emitted from the light source 5 as viewed from the view point 1 via the screen 3. The positional relationship between each of the spheres 7, 9, 11 and 13 and the light source 5 differs from the positional relation between each of the spheres and the view point 1. However, the former relationship may be regarded as identical with the latter to improve the performance of the system.

Figures 2A, 2B:
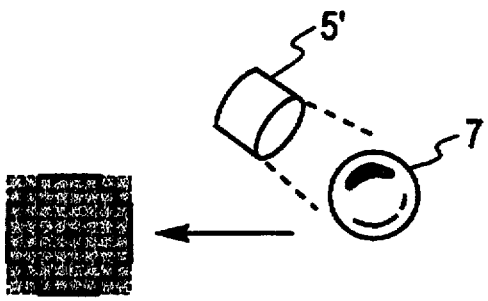
FIG. 2(A) illustrates the environment in the case of drawing a single sphere.
FIG. 2(B) illustrates the projection of the single sphere of FIG. 2(A) onto a display screen.

As shown in FIG. 2(A), the sphere 7 receives a ray of light from the light source 5' and a view point at infinity is assumed. In this case, calculate the projected image (FIG. 2(B)) of the sphere 7 onto the screen 3 (not shown in FIG. 2(B)). This calculation is performed in accordance with a conventional method. Here, the light source 5 is set to a light source 5', but the lighting with the light source 5' is applied not only to the sphere 7 but also the other spheres and requires generality, so that rays of light from the light source 5' are approximated by parallel rays.

The displacement information associated with a sphere is also added to the calculated result in FIG. 2(B) and stored in a memory. In addition, the size of a sphere is normalized so as to easily cope with a further scaling.

In addition, the positions of the centers of the four spheres on the screen are evaluated the radius of each sphere scaled by a scale factor, for example, the reciprocal of the displacement position of the sphere (FIG. 3), to generate a perspective representation of the sphere.

Figure 3:
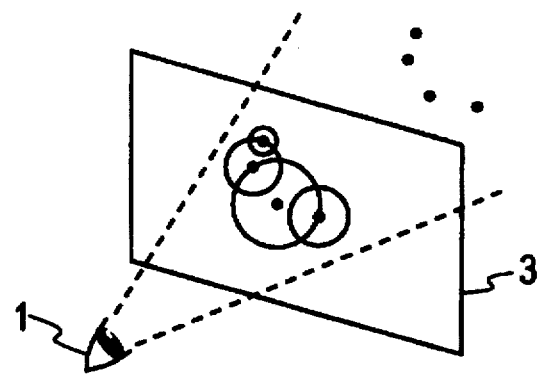
FIG. 3 illustrates the projection of multiple spheres onto a display screen.

The results of scaling are used to expand (or reduce) the normalized image of the sphere and map the expanded (or reduced) image on a position appointed on FIG. 3 (FIG. 4). The mapping is performed while performing the depth test by calculating the depth in each point on the surface of a sphere from the position of the center and the displacement information for the sphere.

Hereinafter, the present invention will be described with reference to FIG. 5. Assume the image to be mapped like FIG. 2(B) has been already calculated. The host processor 21 is arranged to output a command to the geometry processor 23. The geometry processor 23 is arranged to output a command to the fragment generator 25. The fragment generator 25 is connected to the lookup scaling section 29, the color modifying section 31 and the displacement modifying section 33, and connected directly to the pixel processor 35. The lookup scaling section 29 is connected to the texture memory 27, the displacement modifying section 33, and the color modifying section 31. And, outputs of the displacement modifying section 33 and the color modifying section 31 with an output of the fragment generator 25 are connected to the pixel processor 35, which is connected to the frame buffer 37.

Here, as shown in FIG. 2(B), it is assumed that under environment in which the view point is located at infinity and a collimated light source is positioned at a predetermined position, a texture image previously calculated of a sphere with the displacement information thereof is stored in the texture memory 27, the color information of the texture image is stored to be enclosed with a cubic of each side equal to double the radius as shown in FIG. 6(a). The displacement information in a section along x–x' becomes like FIG. 6(b). This color information of the previously calculated texture image for a sphere can be calculated also in the apparatus shown in FIG. 5. This will be mentioned according to the need in the following description.

As a simple example, the case of drawing a sphere will be described. In the host processor 21, a certain application program outputs a drawing command, including the coordinates (xo, yo, zo) of the center for a sphere to be drawn in a world frame of axis, the radius R of the sphere, the Z value Do of the center, and information about the color of the sphere (information about material or reflection coefficient is typical and the color of light illuminated from the light source is specified in some cases) to the geometry processor 23. In a scene like FIG. 1, for example, this indicates that the coordinates of the center for a sphere 7 and the like are specified. Also in the case of calculating a texture image previously stored in the texture memory for a sphere, a similar situation holds.

Having received the drawing command mentioned above, the geometry processor 23 projects the sphere to be drawn onto the screen 3 and evaluates the coordinates (xos, yos) of the center of the sphere on the screen 3 and the radius of the sphere (circle) while taking cognizance of being able to use a texture image previously stored in the texture memory for the sphere. Normally, the radius (e.g., 2R/Do) of the sphere (circle) is evaluated in such a way as to be proportional to the reciprocal of the Z value of the center of the sphere specified by a world frame of axis as mentioned above, but may be evaluated by using another method. And, when such a sphere (circle) is evaluated, regard it as included in a square ABCD of a side equal to double the previously evaluated radius and find the coordinate of each vertex for the square ABCD. And, divide this square into two triangles ABC and ACD. Since the previous stored texture image is also stored in a form shown in FIG. 6(A) as mentioned above, the vertices A, B, C and D correspond to those of the previously stored texture image, respectively. Thus, the geometry processor 23 specifies the coordinates (s, t) of the texture image corresponding to the vertices A, B, C and D.

The geometry processor 23 gives the color information specified by the host processor 21 also corresponding to the vertices A, B, C and D. However, each of the vertices A, B, C, and D has ordinarily no color information because of being no point in the sphere (circle). Thus, assuming the whole sphere has the same color information, the color information from the host processor 21 is given to each of the vertices A, B, C, and D for convenience as it is. Thus, the coordinates and color information on the screen for each vertex of the square ABCD and the coordinates of the corresponding texture image are determined and accordingly they are outputted to the fragment generator 25 in the unit of a triangle. At this time, the Z value Do for the center of a sphere is also outputted.

Having received the coordinates and color information for each vertex and the coordinates of the corresponding texture image in the unit of a triangle, the fragment generator 25 determines the coordinates and color information for points in the triangle and the coordinates of the corresponding texture image by interpolation. If a mipmap texture mapping mechanism is used, the expanding/reducing ratio ρ (pixel-texel ratio and, for a texel, refer to the appendix) is generated by the fragment generator 25. The expanding/reducing ratio ρ represents the ratio of the sphere to be drawn to the sphere of the texture image incidentally, the color information does not change in interpolations because of being identical for all vertices of the triangle. Preferably, the expanding/reducing ratio ρ is calculated as follows for a triangle having three vertices A,B,C, wherein vertex A is associated with coordinates (x1,y1) in the pixel coordinate system and coordinates (s1,t1) in the normalized texture coordinate system, wherein vertex B is associated with coordinates (x2,y2) in the pixel coordinate system and coordinates (s2,t2) in the normalized texture coordinate system, and wherein vertex C is associated with coordinates (x3,y3) in the pixel coordinate system and coordinates (s3,t3) in the normalized texture coordinate system:

$$\rho_s = (s2-s3)/(x2-x3)$$

$$\rho_t = (t2-t3)/(y2-y3)$$

$$\rho = \max(\rho_s, \rho_t)$$

or $$\rho = \sqrt{\rho_s^2 + \rho_t^2}$$

The fragment generator 25 outputs the coordinates (x, y) of a point in each triangle directly to the pixel processor 35, outputs the Z value Do for the center of a sphere (circle) received from the geometry processor 23 to the displacement modifying section 33, outputs the color information computed by an interpolation to the color modifying section 31 and outputs the interpolated coordinates (s, t) of the texture image and ρ to the lookup scaling section 29.

Having received the coordinates (s, t) of the texture image and ρ, the lookup scaling section 29 first performs an operation of extracting the required data from the texture memory 27. In an ordinary texture mapping, a method for holding a plurality of texture images of sizes matching the expanding/reducing ratio and generating the color information of texture images by using a plurality of texture images (mipmap using method), a method for generating the color information of texture images by using the color information adjacent to a point in the texture image corresponding to the coordinates of the texture image and ρ and the like are employed. For further details, refer to the background material related to texture mapping presented above. In any event, the address of data required for generating the color information of a texture image is calculated from the interpolated coordinates (s, t) of the texture image and ρ to extract the required data from the texture memory 27.

Here, the present invention holds not only color information of the surface of a sphere but also displacement information of the sphere. Thus, displacement information must be also modified in accordance with ρ. Then, the following method for modifying the displacement information is proposed.

1. Simple ρ division method

In this case, displacement information D (displacement) is defined by $$D = Md(s, t)/\rho,$$

where Md(s, t) is a function to consult the storing texture memory of the displacement information for a given s and t and return the relevant value. In this case, one item of displacement information D about a set of s and t is only necessary for the texture memory.

2. Mipmap using method

Mipmap is used as means for promoting the quality of a texture mapping and also as means for reducing the time of calculation. Normally, previously creating n sheets of images with the length and width modified by the factor of $2^{-i}$ after performing a filtering to an original image, two sheets of images having the most nearest size are selected and an image interpolated from them is used in execution of mipmap. An image of $2^{-i}$ times the original is referred to as image of level i. There are various interpolation methods (refer to the appendix).

For displacement information D, a mipmap of $2^{-i}$ times concerning D (s and t are not modified) is previously calculated and held.

A mipmap between the levels is obtained by a linear interpolation:

$$L_1 = \lfloor \log_2 \rho \rfloor$$

where L1 id the largest integer of $\log_2 \rho$.

Two levels are calculated in accordance with L=L1+1. And, letting Dl be the displacement information about (s, t) at the level L1 and Dh be the displacement information about (s, t) at the level L, $$n = 2\left(1 - \frac{2^U}{\rho}\right)$$

$$D = (1-n)Dl + nDh$$
$$= (Dh - Dl)n + Dl$$

As to these Dl and Dh, 4 points or 16 points near the point corresponding to (s, t) are taken and the filtering value of them may be employed. Such a method will promote the quality (used for calculating the color information).

As mentioned above, a collection of displacement information for the relevant levels must be previously stored in the texture memory when using mipmaps. In this way, whether a mipmap using method is employed or not, the lookup scaling section 29 refers to the coordinates (s, t) of a texture image and ρ, extracts the data required for calculating the color information and displacement information of the texture image corresponding thereto from the texture memory, and calculates a necessary calculation. The color information corresponding to each set of screen coordinates (x, y) is outputted to the color modifying section 31 for modification with the color information specified by the host processor 21. On the other hand, the displacement information corresponding to each set of screen coordinates (x, y) is outputted to the displacement modifying section 33 for calculating the Z value on a surface of a sphere with the Z value Do at the center of the sphere.

Referring to the color information of the texture image from the lookup scaling section 29 and the color information from the fragment generator 25, the color modifying section 31 performs a necessary calculation. This calculation differs with the property of the specified color information from the fragment generator 25. For example, this is because the case of specifying the color of light illuminated from a light source and that of specifying the material and reflection coefficient of a sphere naturally differ in effectiveness. This calculation will be omitted because of similarity to a conventional one. The color modifying section 31 outputs the calculated color information to the pixel processor 35.

Referring to the displacement information D based on the texture image from the lookup scaling section 29 and the Z value Do for the center of a sphere from the fragment generator 25, the displacement modifying section 33 calculates the Zm value for a surface of the sphere at the screen coordinates (x, y). Here, the case of Zm=Do+D, the case of Zm=Do−D, and the case of Zm=Do can be considered.

Also, a user may instruct the pixel processor 35 to draw only images of Zmin<=Zm<=Zmax for his specified values of Zmin and Zmax. The displacement modifying section 33 outputs the calculated Zm to the pixel processor 35.

The pixel processor 35 performs a depth test. That is, based on the Zm calculated in the displacement modifying section 33, the pixel processor 35 decides whether it writes the color information (R", G", B", A") calculated for each set of coordinates (x, y) on the screen generated by the fragment generator 25 in the color modifying section 31 into the frame buffer 37 or not. If the data written formerly in the frame buffer 37 are nearer to the screen, the newly generated color information will not be written in the frame buffer 37. Thus, since the Z value of the surface of the sphere is accurately determined, the depth test can be easily performed. Furthermore, when overlapped spheres are displayed, the boundary line between the spheres for one spheres encroaching on another can be clearly and accurately drawn.

As mentioned above, by reading the drawing data written in the frame buffer 37 according to the need and performing a D/A conversion, a sphere comes to be displayed on the display 39.

Drawing a sphere has thus far been described. However, it is described above that the present invention can be used not only for drawing a sphere but also, say, for a pipe CAD. In this pipe CAD, there are cases where the a-end of a pipe is in the depths relative to the screen and the b-end is on this side relative to the screen, as shown in FIG. 7. In such a case, it is necessary to specify the displacement information in a different content for the a-end and for the b-end. Normally, the displacement information is automatically calculated in the lookup scaling section 29 after ρ evaluated in the fragment generator 25. However, allowing a user to specify the displacement information with an application to be executed in the host processor 21 is also a great burden to a user but heightens the degree of freedom. Thus, when the object to be drawn is divided into triangles in the geometry processor 23, such a modification is also possible as enables the r corresponding to the displacement information to be specified for each vertex of individual triangles and s, t, r to be outputted from the fragment generator 25 for each set of coordinates (x, y) on the screen.

Furthermore, according to the above description, color information is specified and the interpolated color information is sent to the color modifying section 31 to be blended with the color information from the texture memory 27, but if the possibility of color modification is lower than a fixed level, a texture image corresponding to each color information is previously stored in the texture memory 27 and the modification can be sufficiently solved by citing the relevant texture image from the texture memory. Such arrangement eliminates the need for calculation in the color modifying section 31 and enables the color modifying section 31 to be omitted according to the circumstances.

Figure 5:
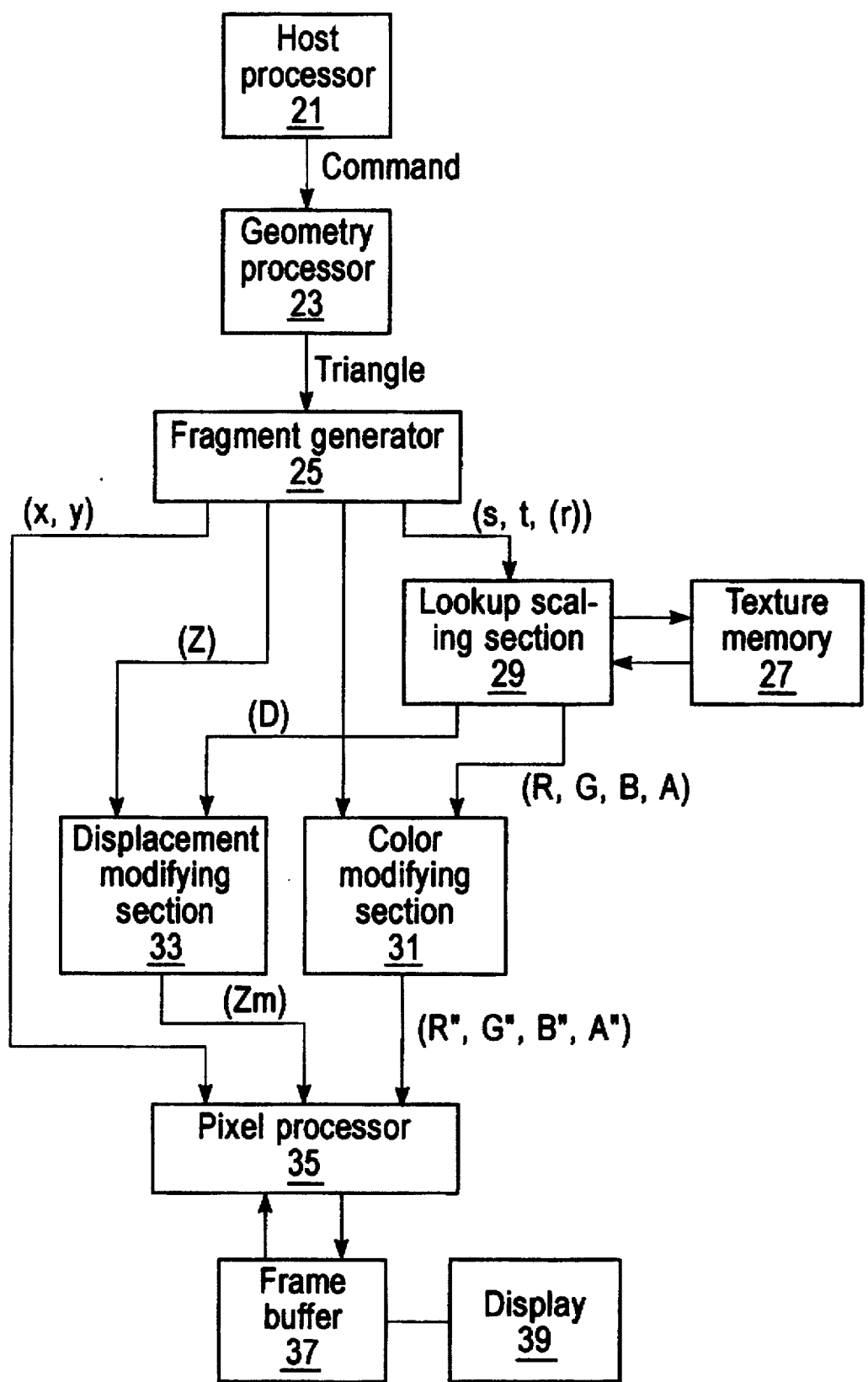
FIG. 5 is a functional block diagram of a graphics system according to the present invention.

In addition, the apparatus shown in FIG. 5 operates following a flow of information. For example, a plurality of fragment generators and succeeding sections are prepared and the rapidity of drawing can be enlarged by dividing the screen.

As described above, holding not only the color information (2-dimensional information) of a complicated-shaped (complicated for drawing with a computer) object but also the displacement information of the object enabled a plurality of similar objects to be drawn at a high speed. Concretely, a computer system capable of rapidly coping with the case of drawing numerous spheres or that of drawing numerous pipes as in a pipe CAD could be provided.

We claim:

1. A graphics apparatus using texture images with displacement information, comprising:

a texture memory for storing color information of a surface of an object and displacement information of the object;

reading means for reading out from said texture memory said color information of a surface of an object and said displacement information of the object in response to receiving a command instructing said apparatus to draw the object according to a size and a position specified by the command;

size modifying means for modifying said color information and said displacement information read from said texture memory such that said color information and said displacement information correspond to the size specified in said command;

hidden surface processing means for performing a hidden surface removal for the drawing of the object by using said color information and said displacement information output from said size modifying means and said position specified in said command.

2. The graphics apparatus of claim 1, wherein said modifying means expands said color information and said displacement information read from said texture memory.

3. The graphics apparatus of claim 1, wherein said modifying means reduces said color information and said displacement information read from said texture memory.

4. The graphics apparatus of claim 1, wherein said command specifies displacement information and wherein said size modifying means modifies said color information and said displacement information read from said texture memory such that said color information and said displacement information correspond to the displacement information specified in said command.

5. The graphics apparatus of claim 1, wherein said command specifies color information, said apparatus further comprising:

color modifying means for modifying said color information of the surface of the object processed by said size modifying means based on said color information specified in said command.

6. The graphics apparatus of claim 5, wherein said hidden surface processing means performs said hidden surface removal for the drawing of the object using color information output from said color modifying means.

7. The graphics apparatus of claim 1, wherein said reading means comprises:

means for identifying said color information and said displacement information, and for calculating an address in said texture memory in which said color information and said displacement information is stored; and means for reading said color information and said displacement information from said texture memory using said calculated addresses.

8. The graphics apparatus of claim 1, wherein said hidden surface processing means comprises:

means for calculating the displacement position of said surface of said object from the displacement information of said object processed by said size modifying means and from the displacement position in the depth direction to the drawing screen of said object among the positions specified in said command; and means for performing a hidden surface removal based on the calculated displacement position of said surface of said object and the plane position in the parallel direction to the drawing screen of said object among the positions specified in said command.

9. The graphics apparatus of claim 1, wherein said object is a sphere.

10. The graphics apparatus of claim 1, wherein said size modifying means calculates an expanding/reducing ratio of the object to be drawn, and performs an expanding/reducing processing on said color information of the surface of said object and said displacement information of said object in accordance with said calculated expanding/reducing ratio.

* * * * *